United States Patent
Nettesheim et al.

(10) Patent No.: US 9,925,548 B2
(45) Date of Patent: Mar. 27, 2018

(54) APPARATUS FOR USE OF POWDER FROM THE CONTAINER

(71) Applicant: Maschinenfabrik Reinhausen GmbH, Regensburg (DE)

(72) Inventors: Stefan Nettesheim, Regensburg (DE); Arif Demirci, Tegernheim (DE)

(73) Assignee: Maschinenfabrik Reinhausen GmbH, Regensburg (DE)

(*) Notice: Subject to any disclaimer, the term of this patent is extended or adjusted under 35 U.S.C. 154(b) by 50 days.

(21) Appl. No.: 14/982,919

(22) Filed: Dec. 29, 2015

(65) Prior Publication Data

US 2016/0184845 A1 Jun. 30, 2016

Related U.S. Application Data

(62) Division of application No. 13/855,476, filed on Apr. 2, 2013, now Pat. No. 9,254,955.

(30) Foreign Application Priority Data

Apr. 3, 2012 (DE) .................. 10 2012 102 885

(51) Int. Cl.
| | |
|---|---|
| B05B 7/14 | (2006.01) |
| B65D 85/00 | (2006.01) |
| G06Q 10/08 | (2012.01) |
| B65G 51/02 | (2006.01) |
| B05B 7/22 | (2006.01) |
| B05B 12/08 | (2006.01) |

(52) U.S. Cl.
CPC ............ *B05B 7/1472* (2013.01); *B65D 85/00* (2013.01); *B65G 51/02* (2013.01); *G06Q 10/087* (2013.01); *B05B 7/226* (2013.01); *B05B 12/081* (2013.01); *B65D 2203/10* (2013.01)

(58) Field of Classification Search
CPC .. B65D 2203/00; B65D 2203/10; B05B 7/14; B05B 7/1472
USPC .............................................. 141/65, 63, 94
See application file for complete search history.

(56) References Cited

U.S. PATENT DOCUMENTS

| | | | | |
|---|---|---|---|---|
| 5,273,584 | A | * 12/1993 | Keller | ...................... B05B 7/144 |
| | | | | 118/308 |
| 5,816,509 | A | * 10/1998 | Ahn | ....................... B05B 7/1404 |
| | | | | 241/39 |
| 6,615,881 | B2 | 9/2003 | Bartholomew et al. | |
| 6,672,341 | B2 | 1/2004 | Bartholomew et al. | |

(Continued)

FOREIGN PATENT DOCUMENTS

| | | |
|---|---|---|
| DE | 102004061633 A1 | 6/2006 |
| DE | 102007013093 | 9/2008 |

(Continued)

*Primary Examiner* — Timothy L Maust
(74) *Attorney, Agent, or Firm* — Simpson & Simpson, PLLC

(57) ABSTRACT

A container for powder, a method for marking of the containers for the powder and an apparatus for use of a powder. There is at least one RFID Chip provided in the container, wherein the RFID chip stores at least one set of parameters for material characterization of the powder in the container. A unique key is assigned to every type of powder by means of which the data in the RFID chip located in the container are readable, writeable and updateable via an antenna arranged outside the container.

10 Claims, 4 Drawing Sheets

(56) References Cited

U.S. PATENT DOCUMENTS

| | | | |
|---|---|---|---|
| 6,859,634 B2* | 2/2005 | Itoh | G03G 15/0863 399/258 |
| 7,051,771 B2* | 5/2006 | Ede | B65B 63/02 141/12 |
| 7,900,658 B2 | 3/2011 | Osborne et al. | |
| 8,147,169 B1* | 4/2012 | Kvalheim | B65G 53/40 406/109 |
| 8,151,829 B2* | 4/2012 | Makino | B65B 1/16 141/12 |
| 8,151,835 B2* | 4/2012 | Khan | B65B 3/003 141/10 |
| 8,241,710 B2* | 8/2012 | Suss-Wolf | H05H 1/42 427/446 |
| 8,584,714 B2 | 11/2013 | Gaultney | |
| 8,931,524 B2* | 1/2015 | Morii | G03G 15/0879 141/2 |
| 8,993,018 B2 | 3/2015 | Bucher et al. | |
| 9,254,955 B2* | 2/2016 | Nettesheim | B65D 85/00 |
| 9,327,919 B2* | 5/2016 | Nettesheim | B05B 7/144 |
| 2006/0054085 A1* | 3/2006 | Sanner | B05B 7/1472 118/612 |
| 2006/0132351 A1 | 6/2006 | Le Sesne | |
| 2010/0098845 A1 | 4/2010 | Jensen et al. | |
| 2014/0170410 A1* | 6/2014 | Rupprecht | C23C 4/00 428/327 |
| 2016/0184845 A1* | 6/2016 | Nettesheim | B65D 85/00 406/34 |
| 2016/0250653 A1* | 9/2016 | Shah | B05B 7/1445 209/250 |

FOREIGN PATENT DOCUMENTS

| | | |
|---|---|---|
| DE | 102010014552 | 9/2011 |
| EP | 2282184 | 2/2011 |
| JP | 2001130743 | 5/2001 |
| JP | 2006232292 | 9/2006 |
| JP | 2009069108 | 4/2009 |
| JP | 2012001303 A | 1/2012 |
| JP | 2012052151 | 3/2012 |
| WO | 2005002992 | 1/2005 |
| WO | 2012139840 | 10/2012 |

* cited by examiner

APPARATUS FOR USE OF POWDER FROM THE CONTAINER

CROSS-REFERENCE TO RELATED APPLICATIONS

This application is a divisional patent application of U.S. patent application Ser. No. 13/855,476, filed Apr. 2, 2013, which claims priority from German Patent Application No. 10 2012 102 885.0, filed on Apr. 3, 2012, which applications are incorporated herein by reference in their entireties.

FIELD OF THE INVENTION

The invention concerns an apparatus for use of powder. In the embodiment shown an apparatus is described for coating a substrate. There is a container provided for an apparatus, which container contains the powder used for coating. Furthermore, there is a suction means arranged in the container which serves to suck up the powder from a surface of the powder out of the container. Likewise, the suction means is responsible for transport of the powder from the container to the substrate. The container is standing on a pair of scales during removal of the powder from the container.

BACKGROUND OF THE INVENTION

The containers for the powder are used, for example, to feed metered quantities of fine-grained powder for plasma coating processes, or a plasma coating installation. It is important in this process to avoid powder agglomerations and deposits since, otherwise, transport of the powder can come to a standstill.

The published international patent application PCT/EP2012/054340 discloses an apparatus and a method for conveying powder. A container is provided for the powder, wherein the powder defines a surface in the container. A suction means has formed a suction opening for sucking up the powder from the surface. A motion means serves to generate a relative movement between the suction opening and the surface of the powder. Sucking up the powder takes place during the relative movement, wherein a speed of the relative movement can be altered in such a way that a constant mass flow of the powder occurs from the container to the substrate.

German disclosure document DE 10 2010 014 552 A1 discloses a method for plasma coating of a substrate surface with a coating fluid. A plasma beam of a low temperature plasma is directed at a substrate surface. The coating fluid consists of a carrier fluid and a fine-grained powder. The coating fluid is homogenized in an homogenization container and passed on to the plasma by means of a pump and metering system.

European patent application EP 2 282 184 A1 discloses a container for monitoring a fill level of the goods to be removed from the container. The container is suitable for storing powder. There is at least one radio-frequency identification (RFID) chip attached in the container, for example to the bottom of the container. An optical sensor is used in connection with the RFID chip to determine the fill level. The option for material characterization using the RFID chip is not disclosed.

U.S. patent pre-grant publication no. 2006/0132351 A1 discloses a container for monitoring a fill level of a powdered material in which at least one RFID chip is attached. Different containers can be differentiated between on the basis of a set of parameters with identification numbers which the RFID chip carries. Sets of parameters for material characterization, at least those concerning the material identification and quality, are described but these are not put on the RFID chip but are determined instead through measurement together with the RFID chip. A key which allows activation for use of the container is not disclosed.

International patent application WO 2005/002992 A1 discloses a container which is suitable for storing powder and which is provided with at least one RFID chip. The RFID chip is already provided by the manufacturer of a set of parameters for identification of the container and/or its contents. Furthermore, the RFID chip is attached in a separate pocket outside on the container. A key which allows activation for use of the container is not disclosed.

There is an apparatus disclosed in the German patent application DE 10 2007 013 093 A1 for use of powder with a container for storing powder. An arrangement of an RFID chip which carries a parameter set for material characterization is not mentioned. Also the Japanese patent application JP 2001 130 743 does not disclose arrangement of a RFID chip in the container. It simply discloses sucking up of the powder out of the container.

Sucking up of the powder takes place exclusively from the surface of the powder contained in the container. In order to achieve a constant mass flow of powder from the container to the surface of a substrate it is absolutely essential that certain quality criteria of the powder are met. The quality criteria of the powder are not only responsible for transport of the powder from the container to the substrate but also influence the quality of the coating applied to a surface of the substrate. Transport of the powder and the quality of the coating depend on the mass, the size of the powder particles and possibly contamination of the container.

BRIEF SUMMARY OF THE INVENTION

It is an object of the invention to create an apparatus for use of the powder wherein it is secure that certain quality criteria or the parameters for the powder used for the apparatus are fulfilled. Furthermore, the apparatus allows easier and simpler setting up of the apparatus for use of the powder.

The above object is solved by an apparatus for use of powder which comprises:
- a container for the powder;
- a suction means for sucking up the powder from a surface of the powder out of the container and to transport the powder;
- at least one RFID chip is provided with the container; and
- at least one antenna provided for outside the container, for reading and/or writing from or onto the at least one RFID chip, wherein only powder can be used in the apparatus which is released by means of the key.

A powder container is used in the apparatus as disclosed according to the invention. Although the following description refers to a powder container for coating of a substrate, this should not be seen as a limitation of the invention. The container can be used for general metering installations, weighing equipment, filling installations, mixing installations, etc. There is at least one RFID chip provided in the container which has at least one set of parameters for material characterization of the powder contained in the container. Each type of powder is assigned an extra key with which the data contained in the RFID chips in the container can be read, written and updated via an antenna arranged outside the container. Using the parameters activated by an authorized key for the powder contained in the container, an option is created for additional quality assurance. Thus, a user of powder can be quite sure that he is using qualitatively certified powder. Furthermore, it is ensured for the manufacturer of the installation for using the powder that only certified powder can be used on the installations. If a malfunction occurs, the manufacturer of the installation can, in a very simple way, check whether non-authorized powder was used on the installation. The powder data resp. parameters are, for example, stored in a memory unit in the installation.

The RFID chip also functions when it is covered on the bottom of the container by a metallic or electrically conductive powder or is embedded in a metallic or electrically conductive powder.

As already mentioned there is the possibility of use of an appropriately fitted out container in the coating area. For a coating installation it can, for example, be an installation for coating using a plasma. This should not be considered as a limitation of the invention.

The RFID chip can be attached to the bottom of the container. Furthermore, the RFID chip can be attached to a wall of the container. It is also conceivable that a number of RFID chips are arranged evenly distributed in the powder within the container. This means that the RFID chips swim freely in the powder. The powder can be an electrically conductive powder.

The powder can be used in an apparatus for using the powder. One option for use is coating of a substrate in an apparatus for coating. Although the following description is limited to a method for coating a substrate, this should not be considered as a limitation of the method according to the invention. At least one RFID chip is assigned to each container for marking/identifying a container. The powder can be filled into the container once this has been completed. For a case where a plurality of RFID chips are arranged evenly distributed in the powder, the RFID chips are mixed together with the powder and filled into the container. Once the powder and the RFID chip are located in the container, a key is called up or requested by a manufacturer of the apparatus for use or for coating a substrate. The keys can, for example, be managed in a central database. The data of the at least one RFID chip contained in the container are read, written and called up by means of the key with an individual set of parameters via an antenna arranged outside the container. The antenna can, for example, surround the container. Here, the antenna can be designed as both a transmitter and a receiver.

It is also possible that the individual set of parameters is read, written and updated during the process of coating of a substrate with powder during emptying of the powder out of the container. The set of parameters can include the setting values of the apparatus for coating which is stored on the RFID chip. These setting values of the apparatus for coating can be used for further subsequent work steps of the apparatus. The set of parameters also comprises batch and manufacturer verifications for the powder. The set of parameters furthermore comprises the filling quantity of the powder contained in the container, which significantly simplifies setting up of the apparatus for renewed use of the container in a later work step. One further option for a set of parameters is the material characterization of the powder contained in the container. Here, the material characterization comprises, for example, the distribution of particle size of the powder, its electrical properties, the date of manufacture, etc. The set of parameters can also represent a residual quantity of the powder contained in the container. The residual quantity of the powder contained in the container forms during the emptying process in the apparatus for coating and is written for further processing steps on the RFID chip.

The set of parameters can also comprise a position or location of a suction means with reference to a surface of the powder contained in the container so that it is possible for a renewed start-up of the apparatus for coating in a partially emptied container that the suction means can be moved by means of an adjustment device at a defined distance to the surface or at a defined immersion depth in the surface of the powder.

The description of the apparatus also refers to an apparatus for coating a substrate. It is self evident for a person skilled in the art that the apparatus can above all be used for all powder containers for which powder from a container for arbitrary applications is used. The following description should not represent a limitation of the invention. The apparatus for coating a substrate is assigned to a powder container used for the coating. Furthermore, the apparatus possesses a suction means, which serves to suck up the powder from the surface of the powder out of the container. The suction means also serves to transport the powder from the container to a substrate. The container stands on a pair of scales during removal of the powder from the container by using the suction means. The container itself is equipped with an RFID chip and is provided with at least one antenna outside the container for reading data from at least one RFID chip and/or writing of data onto at least one RFID chip. It is also possible to lock down the apparatus using the data on the RFID chip authorized by the key if there is powder in the apparatus which is not released by a key or there is no RFID chip assigned to the powder container.

The antenna itself can be integrated into the pair of scales. The pair of scales can also just be assigned to the pair of scales so that the RFID chip can be detected by the antenna.

The apparatus comprises an adjusting element so that the suction means can be positioned on the basis of the data present on the RFID chip relative to the surface of the powder present in the container in such a way that a required quantity of powder per unit of time for coating the substrate can be set automatically.

The sucking up of the powder using the suction means in the cover layer preferably takes place near to the surface of the powder. This sucking up near to the surface of the powder also always ensures, for fine-grained powders with particle sizes of 0.01 to 100 μm, that adequate transport of the powder from the container to the substrate is achieved. As already mentioned, three-axis systems can be use as motion means for generation of the relative movement. Using this motion means, it is possible to generate a movement of the suction means in the X, Y and Z direction. Thus, through use of the three-axis system, it is possible to effect distribution of the suction means in the Z direction which is defined on the basis of the data on the RFID chip. It is therefore possible, by means of the data present on the RFID chip, to achieve exact setting up of the suction means in relation to the powder present in the container.

Using this setting in the Z direction, it is therefore possible to achieve a constant immersion depth of the suction means in the surface of the powder. It is also possible to achieve a corresponding tracking or positioning of the suction opening of the suction means if an already used container is again used in the apparatus for coating in order to coat a further substrate with the same material or powder.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
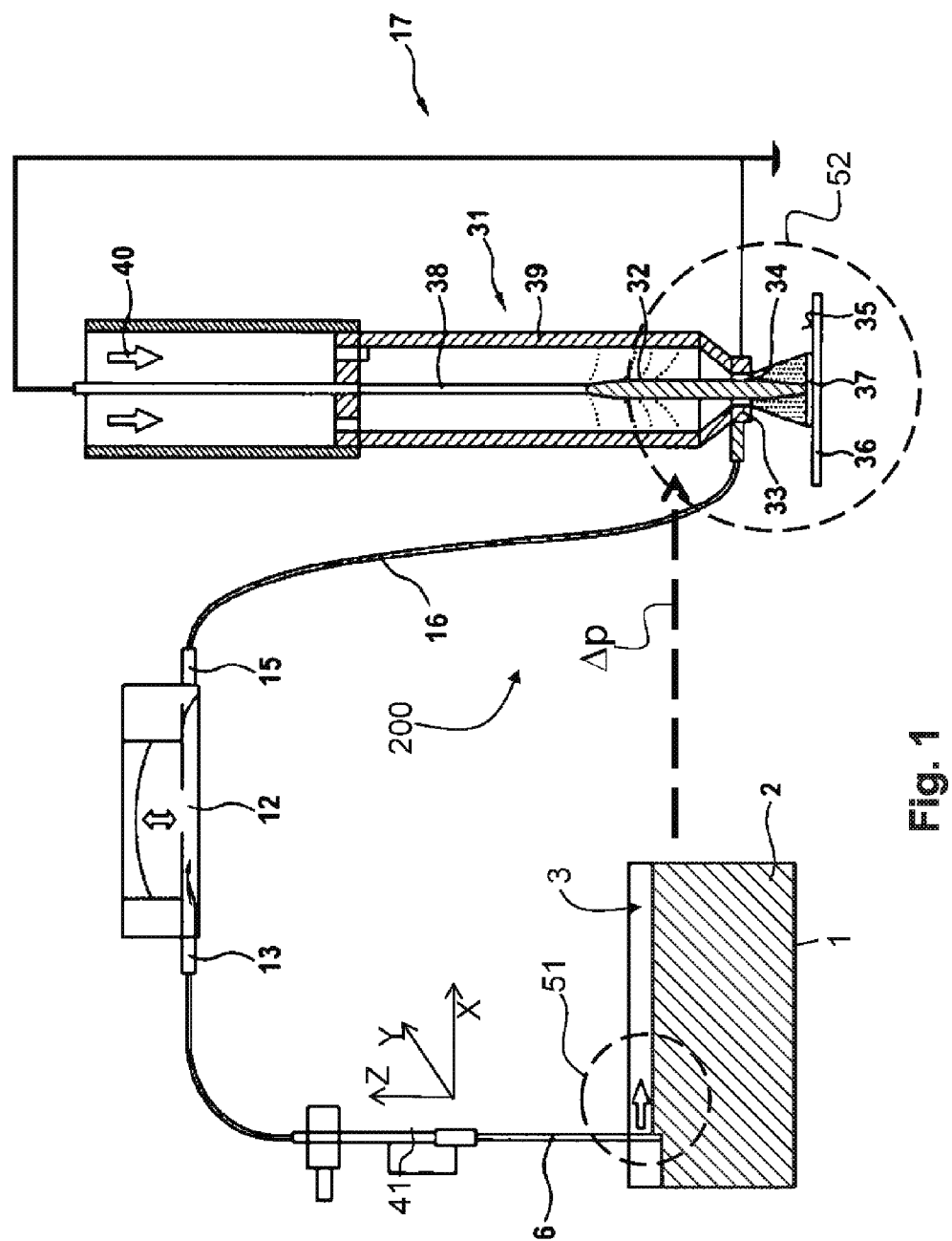
FIG. 1 is an apparatus for forwarding powder, wherein the apparatus shown here is used to coat a substrate with powder and the fine-grained powder is conveyed by the container to the substrate.
Figure 2:
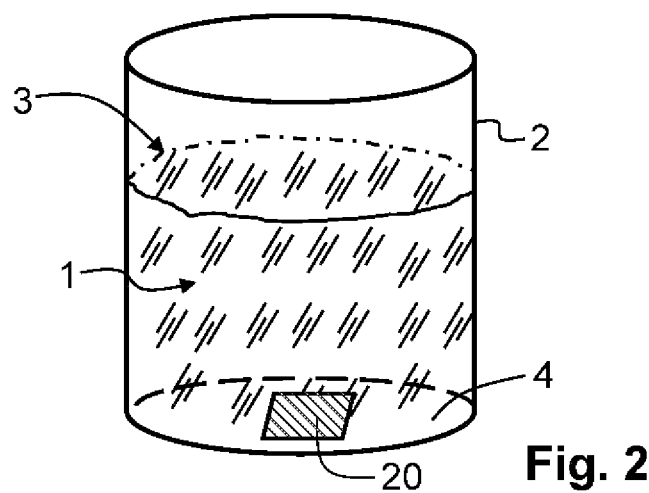
FIG. 2 is an embodiment of the container according to the invention wherein the RFID chip is attached to the bottom of the container.
Figure 3:
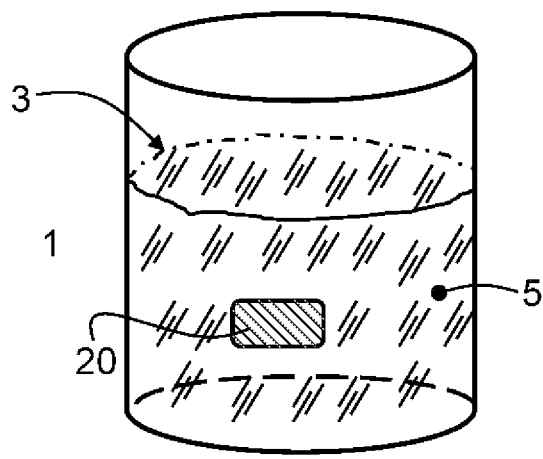
FIG. 3 is a further embodiment of the container according to the invention wherein the RFID chip is attached to a wall of the container.
Figure 4:
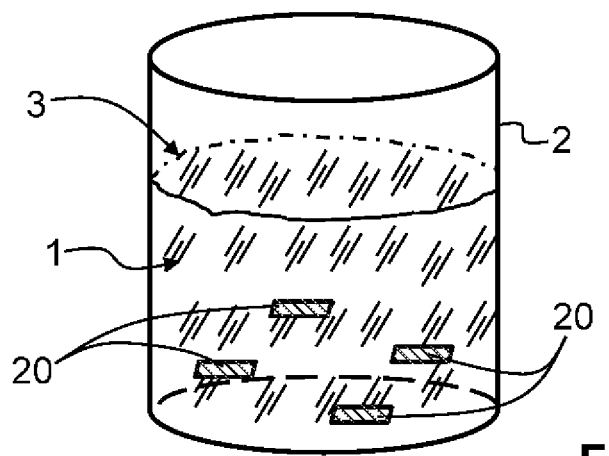
FIG. 4 is a further embodiment of the container according to the invention wherein a plurality of RFID chips is evenly distributed in the powder.

FIG. 1 shows apparatus 200 for coating using fine-grained, non-flowable powder 1 with particle sizes of 0.01 µm to 100 µm. Powder 1 is stored in container 2. Powder 1 in container 2 forms surface 3 from which powder 1 can be removed from container 2 using suction means 6. Suction means 6 can be moved using multi-axis system 41 in X direction X, Y direction Y and Z direction Z in order to suck up the powder from whole surface 3. Pressure difference $\Delta p$ is formed between first working space 51 and second working space 52. Based on pressure difference $\Delta p$ it is possible that powder 1 is transported out of container 2 to surface 35 of substrate 36 which is located on second working space 52.

One option for adjusting pressure difference $\Delta p$ between surface 3 of powder 1 and surface 3 of substrate 35 or between first working space 51 and second working space 52 is offered by membrane pump 12. In this case, membrane pump 12 is connected to suction side 13 with suction means 6. Pressure line 16 is attached to pressure side 15 of membrane pump 12, which pressure line is connected with beam generator 31 for generating a focused plasma beam 32 through arc discharge. Plasma beam 32 from beam generator 31 is used to transport powder 1 by means of nozzle 33 in the area of its outlet 34 into the feed area. The finely distributed powder 1 is separated out by plasma beam 32 onto surface 35 of substrate 36 as coating 37. Beam generator 31 has inner rod-shaped electrode 38 to generate plasma beam 32 and sheathed electrode 39 surrounding this, insulated from inner rod-shaped electrode 38, which has working gas 40 flowing through it from the opening opposite nozzle 33.

FIG. 2 shows a schematic embodiment of container 2 for powder 1, which is used with the current invention. RFID chip 20 is provided for in or on floor 4 inside container 2. Powder 1 is filled into container 2 and thus covers RFID chip 20 attached to floor 4 of container 2. Here, RFID chip 20 can be directly glued to or laid directly on floor 4. It is also possible for RFID chip 20 to be fitted with a cover (protective cover; not shown) before the powder 1 is filled in.

FIG. 3 shows another embodiment of container 2. In this case, RFID chip 20 is mounted on wall 5 of container 2. It is also possible, in this case, as already mentioned in the description to FIG. 2, that RFID chip 20 is additionally fitted with a protective cover.

FIG. 4 shows a further embodiment of container 2. Here, powder 1 is already mixed with a plurality of RFID chips 20 before it is filled into container 2. Plurality of RFID chips 20 is here essentially arranged evenly distributed within powder 1. Therefore, RFID chips 20 swim freely in powder 1 present in container 2.

FIG. 5 shows a schematic arrangement of container 2 with powder 1 within apparatus 200 for coating substrate 36. Apparatus 200 for coating substrate 36 has pair of scales 42 on which container 2 stands. As already mentioned in the description to FIGS. 2 to 4, there is at least one RFID chip 20 provided in container 2. Antenna 10 is assigned to container 2, which is standing on pair of scales 42. Here, antenna 10 can be integrated into pair of scales 42. One further option is that antenna 10 surrounds container 2 while the latter sits on the pair of scales 42. Both possible embodiments are represented in FIG. 5. Through continuous weighing of mass M of powder 1 in container 2 during sucking up of powder 1, the current mass M of powder 1 in container 2 can thus be determined. The data so obtained are passed on to electronic unit 43. Operational amplifier 26 is provided between pair of scales 42 and electronic unit 43 in order to obtain the most accurate measurement data with the pair of scales 42 with respect to mass M of powder 1 in container 2. For the case where the coating process with powder 1 of a particular type is ended, setting up of apparatus 200 can therefore be undertaken for renewed use of this opened packing unit of powder 1 using the data which is stored in electronic unit 43 and written on RFID chip 20 for renewed use of powder 1 of said certain type for coating purposes. It is therefore, for example, possible that the suction means is moved in Z direction Z in such a way that the suction means reaches an appropriate distance for an appropriate immersion depth to be achieved in surface 3 of powder 1. It is therefore possible to approach apparatus 200 automatically so that all parameters required for the coating are set up. Furthermore, the data stored on RFID chip can be used to again to set up the conveying rate of powder 1 out of container 2. The setting-up of apparatus 200 can be simplified considerably for different types of powder 1. By means of antenna 10, the data are read out from RFID chip 20 and passed on to electronic unit 43, which subsequently undertakes the respective settings of apparatus 200 for coating substrate 36.

Figure 6:
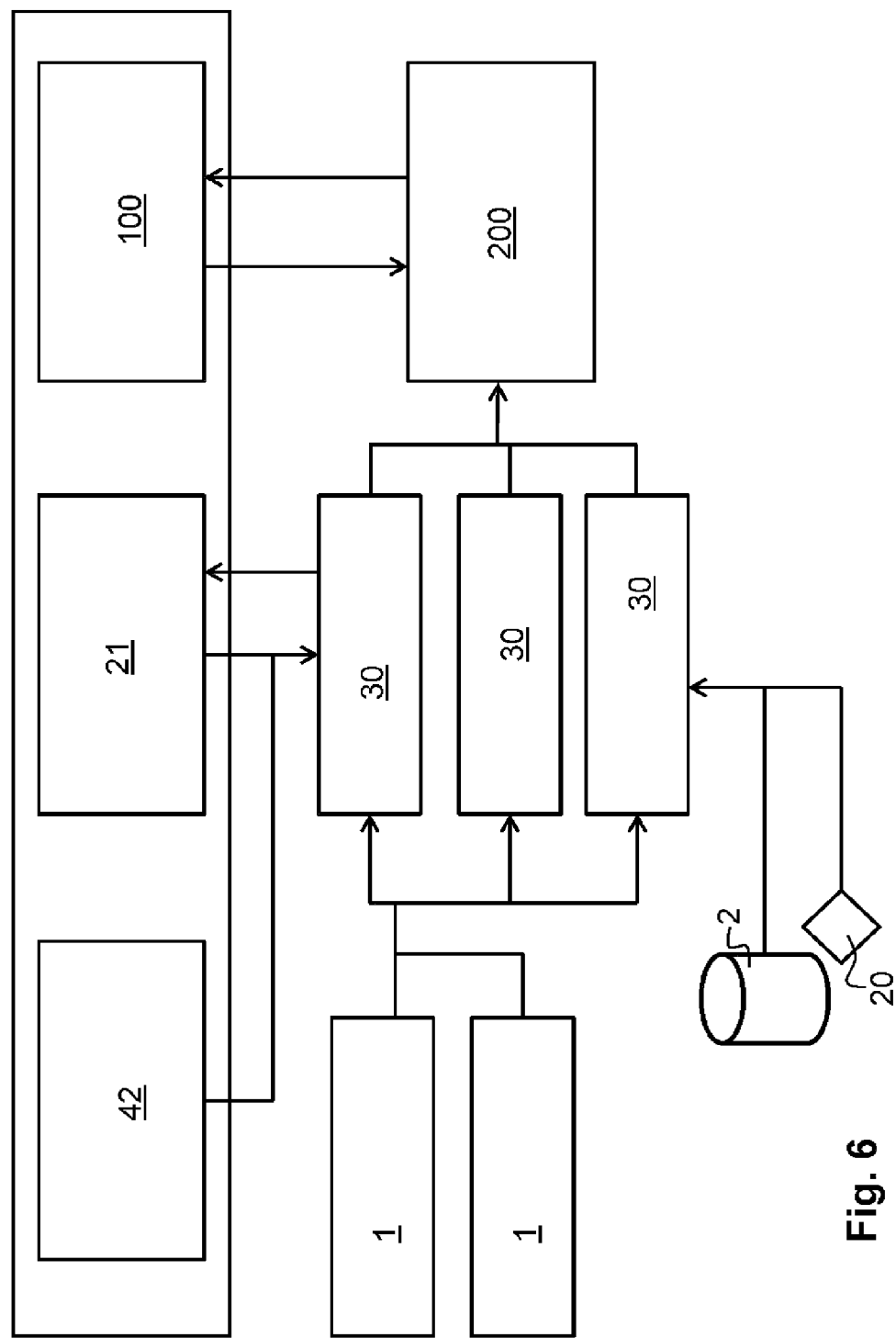

FIG. 6 shows a schematic representation of the method for marking of container 2 for powder 1. There is initially at least one RFID chip 20 assigned to each container 2, which is suitable for receiving powder 1. Powder 1 is made available by various manufacturers in the widest possible range of powder types. Powder 1 is passed on to distributors 30 who subsequently fill powder 1 into different containers 2. Here, one should note that container 2 is possibly already fitted with RFID chip 20, wherein RFID chip 20 is always provided inside container 2. It is also possible to mix a plurality of RFID chips 20 with powder 1 and to pour the mixture of powder 1 and RFID chip 20 into container 2. Distributors 30 call up key 21 from manufacturer 100 for apparatus 200 for use of powder 1 or apparatus 200 for coating substrate 36.

The limitation in the following description of apparatus 200 for coating substrate 36 is not to be considered as a limitation of the invention. Apparatus 200 for use of powder 1 can be a general metering installation, a weighing system, a filling installation, a mixing installation etc. There is therefore an extra key 21 assigned for every type of powder 1. Using key 21, data available on RFID chip 20 in container 2 are read, written and updated with an individual set of parameters via antenna 10 arranged outside container 2. RFID chip 20 activated by distributor 30 by means of key 21 gets in container 2 to apparatus 200 for coating substrate 36. Apparatuses 200 for coating a substrate are usually installed at the premises of an appropriate installation operator who applies a coating to the broadest range of substrates 36. The pair of scales 42 of apparatus 200 for coating is also a quality assurance system so that, for coating, only powder 1 which was released by the prescribed key 21 can be used with apparatus 200. To this effect, as mentioned above, pair of scales 42 is fitted with antenna 10. Antenna 10 can be designed as a transmitter and/or a receiver.

It is also possible, using antenna 10 during emptying of powder 1 from container 2, to read, to write and to update an individual set of parameters on RFID chip 20. The set of parameters which are stored on RFID chip 20 can, for example, be setting values of apparatus 200 for coating. The setting values can also be used for the subsequent work steps for apparatus 200 for coating. The set of parameters also comprises batch and manufacturer verifications for powder 1. It is necessary, in case there are any problems arising during the coating process, that proof is furnished in a simple way that only powder 1 specified by manufacturer 100 was used for apparatus 200 for the coating operation. If this is not the case, then the company operating an apparatus for coating used a non-specified powder 1 or a distributor 30 filled in a non-specified powder 1. One further option for a set of parameters is the material characterization of powder 1. Material characterization includes, for example, the distribution of the individual particle sizes in powder 1, the density, the flowing characteristics, the electrical conductivity and the chemical composition of powder 1, etc.

Figure 5:
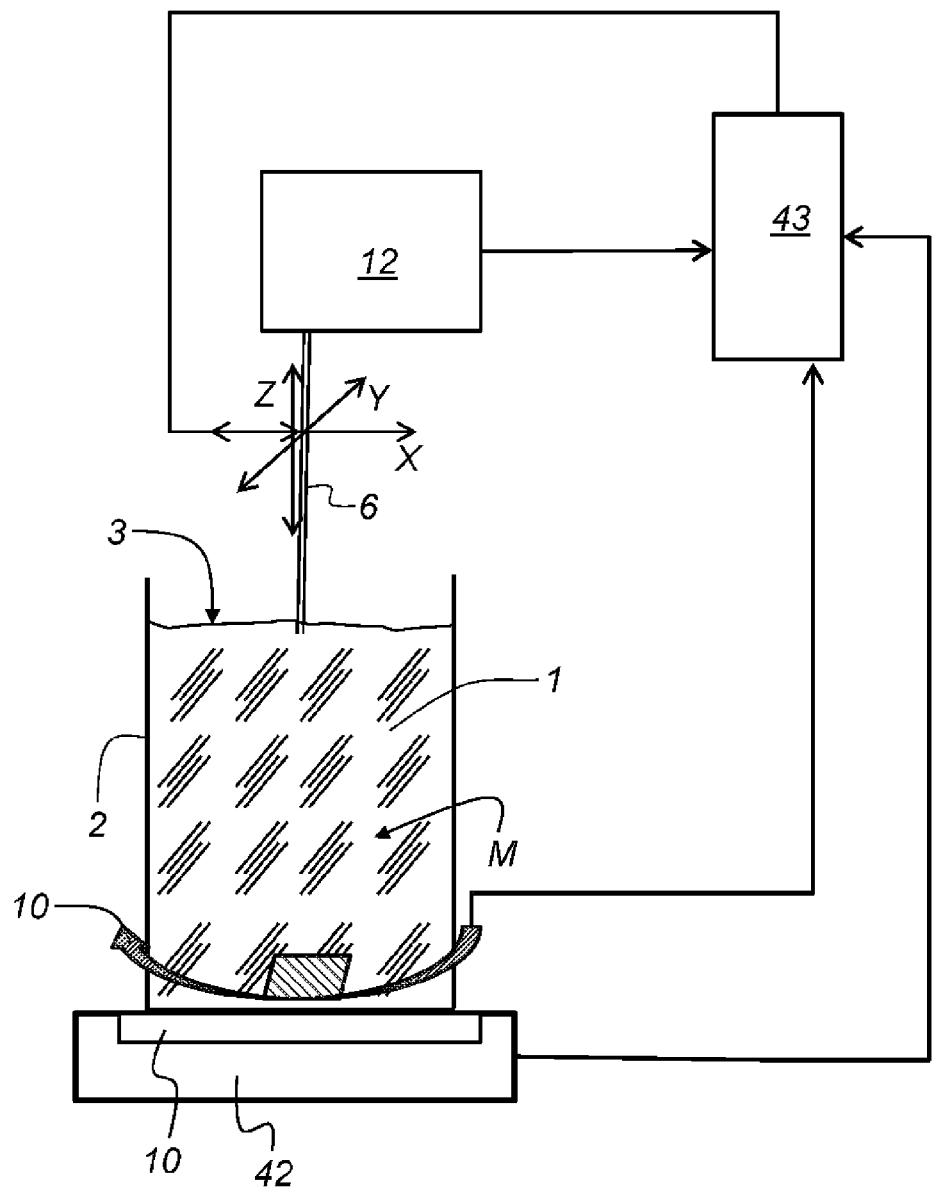
FIG. 5 is a schematic representation of a portion of the apparatus for using powder, wherein here the apparatus is an apparatus for coating and the container stands on a pair of scales, which has an antenna assigned to it or in which an antenna is integrated; and, FIG. 6 is a schematic representation of a block diagram of the method according to the invention for which the respective data is assigned to an RFID chip in order to characterize the powder which is in the container.

It is also possible, as already mentioned in the description to FIG. 5, to detect a residual quantity of powder 1 in container 2. The residual quantity of powder 1 accrues from the emptying process in apparatus 200 for coating. The residual quantity present in the container can therefore be written onto RFID chip 20. The residual quantity is therefore an indicator of the location of surface 3 of powder 1 in container 2. To reuse container 2 with apparatus 200 for coating, apparatus 200 for coating can be set up in a simple manner by using the data available on RFID chip 20. Setting up of apparatus 200 can here take place completely automatically, wherein the suction means is moved in Z direction Z in such a way that it is located at a defined distance from, or at a defined immersion depth in, surface 3 of powder 1. It is therefore possible that, without any influence from a user of apparatus 200 for coating, change between the different, and to some extent applied quantities of powder, is possible in the individual containers.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

REFERENCE NUMERALS

1 Powder
2 Container
3 Surface of the powder
4 Bottom
5 Wall
6 Suction means
10 Antenna
12 Membrane pump
13 Suction side
15 Pressure side
16 Pressure line
17 Plasma coating apparatus
20 RFID chip
21 Key
23 Arrangement
26 Operational amplifier
27 Segment
28 Cable
30 Distributor
31 Beam generator
32 Plasma beam
33 Nozzle
34 Outlet
35 Surface
36 Substrate
37 Coating
38 Rod-shaped electrode
40 Working gas
41 Multi-axis system
42 Balance
43 Electronics
51 First working space
52 Second working space
100 Manufacturer
200 Apparatus for use
M4 Mass of the powder
Δp Pressure difference
X x direction
Y y direction
Z z direction

What is claimed is:

1. An apparatus for use of a powder comprising:
a container for a powder;
a suction means for sucking up said powder from a surface of said powder out of said container and transporting said powder;
at least one RFID chip arranged within said container, said at least one RFID chip arranged to store an individual set of parameters, which comprise setting values for said apparatus for use of powder and setting values for the subsequent work steps of said apparatus for use of powder; and,
at least one antenna arranged outside said container, for reading and/or writing from or onto said at least one RFID chip, wherein only powder can be used in the apparatus which is released by a key;
wherein said individual set of parameters encompasses a residual quantity of said powder in said container, wherein a scale is provided for detecting during an emptying process said residual quantity of said powder in said container in said apparatus and for writing said residual quantity of said powder on said RFID chip.

2. The apparatus according to claim 1, wherein said key is assigned to each type of said at least one RFID chip can be read, written and updated via said at least one antenna.

3. The apparatus according to claim 1, wherein said container stands on a scale and said at least one antenna is integrated in said scale.

4. The apparatus according to claim 1, wherein said at least one RFID chip is attached to a bottom of said container.

5. The apparatus according to claim 1, wherein said at least one RFID chip is attached to a wall of said container.

6. The apparatus according to claim 1, wherein a plurality of RFID chip is arranged evenly distributed in said powder.

7. The apparatus according to claim 1, wherein said individual set of parameters are batch and manufacturer verifications for said powder and include a filling amount of said powder in said container.

8. The apparatus according to claim 1, wherein said individual set of parameters includes a material characterization of said powder in said container.

9. The apparatus according to claim 1, wherein said apparatus for use of said powder is an apparatus for coating a substrate.

10. An apparatus for use of a powder comprising:
a container for a powder;
a suction means for sucking up said powder from a surface of said powder out of said container and transporting said powder;
at least one RFID chip arranged within said container;
an adjusting element, which positions said suction means relative to said surface of said powder in said container on the basis of data present on said at least one RFID chip in such a way that a required amount of powder per unit of time for use of said powder is adjustable automatically; and,
at least one antenna arranged outside said container, for reading and/or writing from or onto said at least one RFID chip, wherein only powder can be used in the apparatus which is released by a key.

* * * * *